United States Patent [19]

Schladweiler

[11] Patent Number: 5,335,768

[45] Date of Patent: Aug. 9, 1994

[54] CONVEYOR CHAIN ASSEMBLY

[75] Inventor: Timothy J. Schladweiler, West Bend, Wis.

[73] Assignee: Rexnord Corporation, Milwaukee, Wis.

[21] Appl. No.: 30,621

[22] Filed: Mar. 12, 1993

[51] Int. Cl.⁵ .............................................. B65G 17/06
[52] U.S. Cl. ...................................... 198/853; 474/224
[58] Field of Search ............................. 198/851–853; 474/156, 206, 207, 212, 219, 223, 224, 228

[56] References Cited

U.S. PATENT DOCUMENTS

| 811,391 | 1/1906 | Gates . | |
|---|---|---|---|
| 1,046,124 | 12/1912 | Wagner . | |
| 2,631,465 | 3/1953 | Cordis | 198/851 |
| 2,951,578 | 9/1960 | Hibbard | 198/851 |
| 4,006,817 | 2/1977 | Paul | 198/853 |
| 4,557,374 | 12/1985 | Bode | 198/852 |
| 4,709,807 | 12/1987 | Poerink | 198/853 |
| 4,832,187 | 5/1989 | Lapeyre | 198/853 |
| 4,858,753 | 8/1989 | Hodlewsky | 198/853 |
| 4,893,710 | 1/1990 | Bailey | 198/853 |
| 4,953,693 | 9/1990 | Draebel | 198/853 |
| 4,993,544 | 2/1991 | Bailey | 198/834 |
| 5,000,312 | 3/1991 | Damkjaer | 198/853 |
| 5,020,659 | 6/1991 | Hodlewsky | 198/853 |
| 5,024,321 | 6/1991 | Lapeyre | 198/853 |
| 5,031,757 | 7/1991 | Draebel | 198/852 |
| 5,083,660 | 1/1992 | Horton | 198/853 |
| 5,123,524 | 6/1992 | Lapeyre | 198/853 |
| 5,217,110 | 6/1993 | Spangler et al. | 198/853 |
| 5,247,789 | 9/1993 | Abbestam et al. | 198/851 |

FOREIGN PATENT DOCUMENTS 2089475  6/1982  United Kingdom .

OTHER PUBLICATIONS

Cambridge Wire Cloth Company-Brochure–"B 3000 Modular Plastic Belt", 1989.

Primary Examiner—Joseph E. Valenza
Attorney, Agent, or Firm—Michael, Best & Friedrich

[57] ABSTRACT

A conveyor chain assembly including a multiplicity of rows of chain modules, each module includes a plurality of link ends with coaxially aligned openings. A chain pin passes through the coaxially aligned openings of adjacent modules. On the opposite ends of each module is a plug socket which is adapted to house a plug. The plug includes a shaft and an arm. The arm is moveable when the shaft is mounted in the socket between a first position in which the arm restricts axial movement of the chain pin and a second position in which the arm does not restrict axial movement of the chain pin.

28 Claims, 2 Drawing Sheets

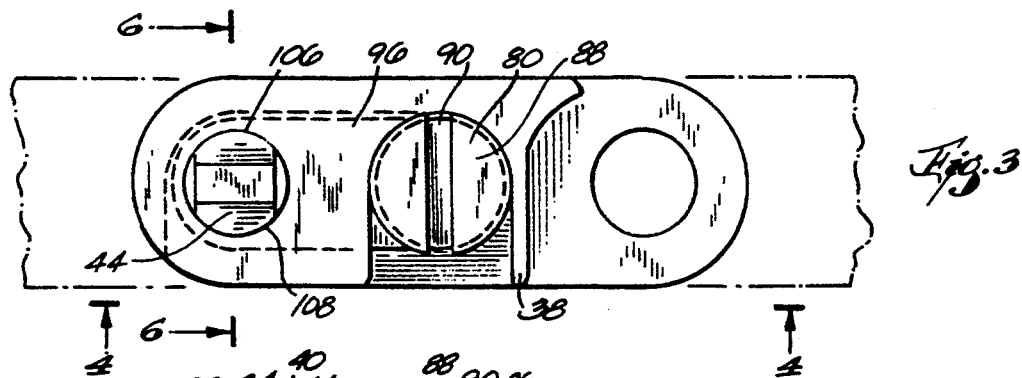
Fig. 3
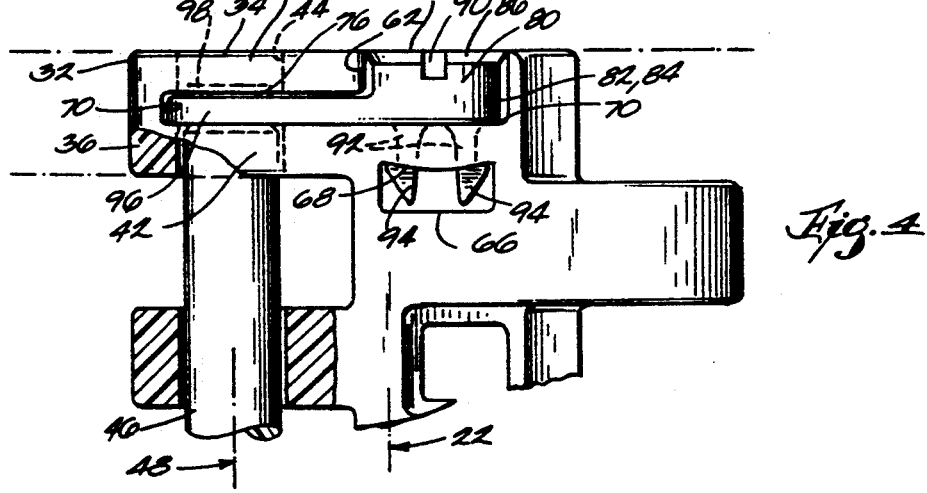
Fig. 4
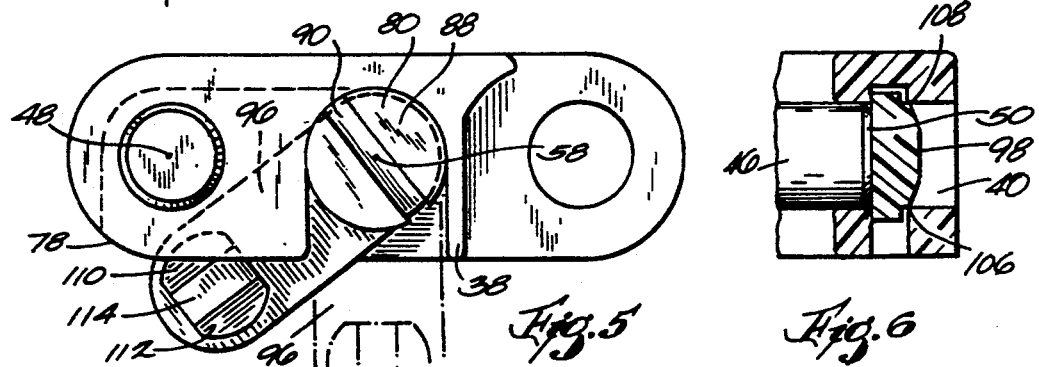
Fig. 5
Fig. 6
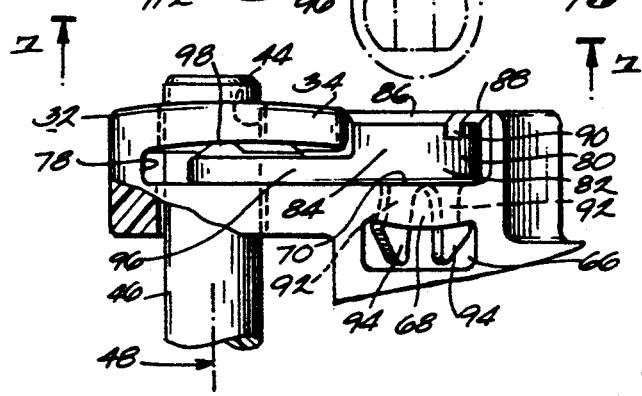
Fig. 7
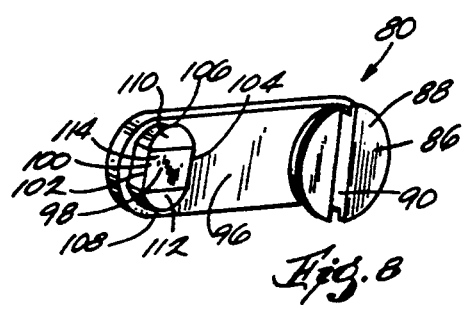
Fig. 8

CONVEYOR CHAIN ASSEMBLY

FIELD OF THE INVENTION

This invention relates to conveyor chain assemblies which are made up of a multiplicity of pivotally interconnected chain modules.

BACKGROUND OF THE INVENTION

Some prior art conveyor chains are comprised of rows of molded plastic chain modules pivotally joined together by chain pins. Each module of such chains has a plurality of spaced link ends which intermesh with the complementary link ends projecting from a module in an adjacent row. Further, each link end has therein a bore which is coaxially aligned with the bores of other link ends to house the chain pin. In some arrangements, the chain pin projects from each edge or side of the conveyor chain and is provided with a head on one end of the chain pin to restrict axial movement of the chain pin. The head can be preformed but, in most cases, the head is formed by heat and pressure after the chain pin has been placed in position in the module. The head also projects from the side of the conveyor and can catch or drag on adjacent structures thus requiring additional lateral clearance between the conveyor and the conveyor guide or between adjacent conveyor chains. To remove the chain pin from an assembled chain, the head on one end of the chain pin has to be cut off. Once the head is severed, the chain pin becomes unusable because its length is too short to form a new head.

Other prior art conveyor chains include plugs housed in the opposite ends of the link end bores to restrict axial movement of the chain pins. The plugs of such chains are normally small parts that can be lost or dropped on the floor of a production facility when they are inserted or removed from the modules. In some prior art constructions, these plugs have a tendency to be dislodged or pop out of the module when the conveyor chain is in use. Without the plug restricting axial movement of chain pin, the chain pins can become dislodged from their proper position and cause a disruption in the conveyor assembly.

SUMMARY OF THE INVENTION

The invention provides a conveyor chain assembly including a multiplicity of rows of chain modules. Each module includes an intermediate section, a plurality of link ends projecting forwardly and rearwardly from the intermediate section with respect to the direction of movement of the conveyor chain. The link ends of each chain module intermesh with the link ends of the chain module in the adjacent row. A chain pin passes through aligned bores provided in the intermeshing link ends between the rows. The module at each end of the row of modules includes a plug socket which houses a plug. The plug includes a first portion mounted in the socket and a second portion which is moveable when the first portion is mounted in the socket. The second portion is moveable between a first position in which the second portion restricts axial movement of the chain pin and a second position in which the second portion does not restrict axial movement of the chain pin.

One feature of the invention is to provide a conveyor chain assembly in which the chain pin can be accessed or removed from the module without damaging the chain pin and without damaging or removing the plug. The plug remains in the module after initial insertion so that the plug cannot be lost or dropped. The plug is moveable in the module with a hand tool between a position which restricts axial movement of the chain pin and a position which does not restrict axial movement of the chain pin.

A further feature of the invention is that the plug is securable in the module in two separate locations which reduces the possibility the plug will pop out of the module.

A further feature of the invention is that the axial forces on the chain pin cause the chain pin to engage the plug in such a manner as to secure the plug in the module even more thus reducing the possibility the plug will pop out of the module. The plug also distributes the axial forces on the chain pin to the module. The plug can thus operate under greater adversities while providing a greater level of reliability to the user.

The invention is not limited to the details of construction and the arrangement of components set forth in the following description or illustrated in the drawings. The invention is capable of other embodiments and of being practiced and carried out in various ways. Also, it is to be understood that the phraseology and terminology employed herein is for the purpose of description and should not be regarded as limiting.

BRIEF DESCRIPTION OF THE DRAWINGS

FIG. 3 is an enlarged end view of a portion of the conveyor chain assembly shown in FIG. 1 and including an end of a chain module with an arm of a plug in a chain pin blocking position.

FIG. 4 is a view taken along line 4—4 in FIG. 3 and with portions broken away for purposes of illustration.

FIG. 5 is a view similar to FIG. 3 showing the arm of the plug in a first position.

FIG. 6 is a partial side view taken along line 6—6 in FIG. 3.

FIG. 7 is a view taken along line 7—7 in FIG. 5 and with portions broken away for purposes of illustration.

FIG. 8 is a perspective view of the plug.

DESCRIPTION OF THE PREFERRED EMBODIMENT

Figure 1:
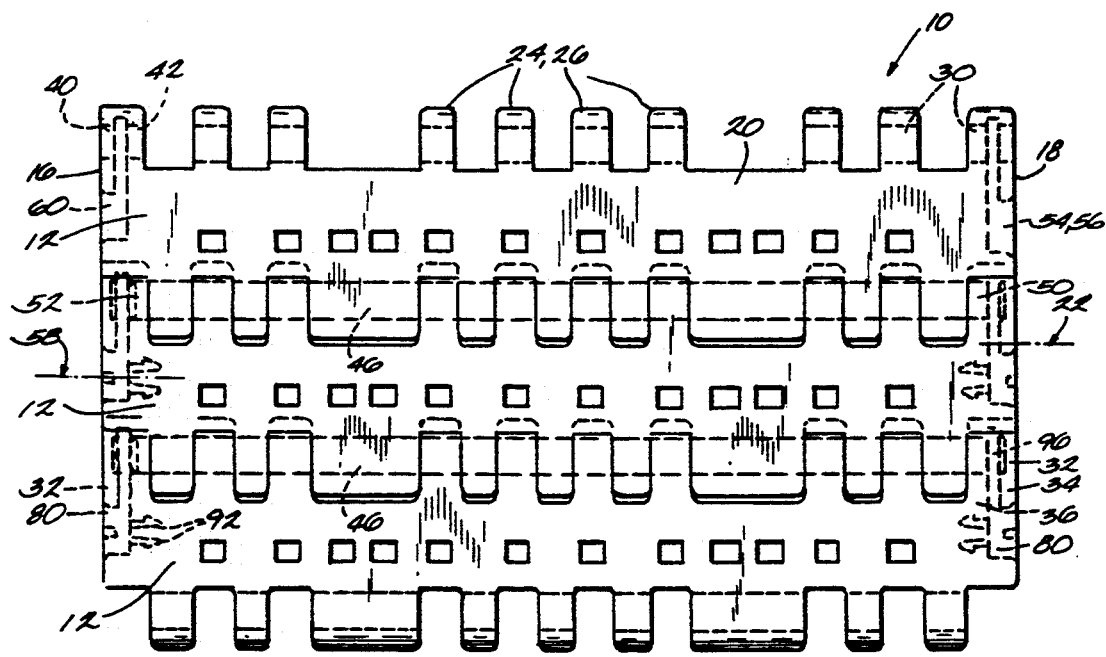
FIG. 1 is a top plan view of a conveyor chain assembly according to the invention.
Figure 2:
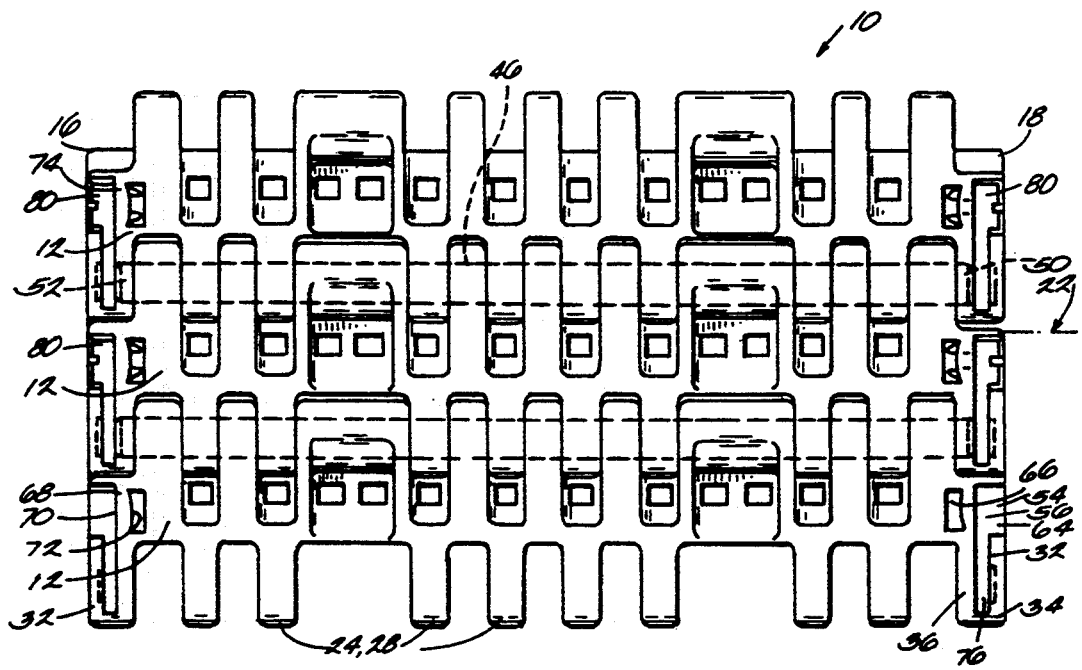
FIG. 2 is a bottom plan view of the conveyor chain assembly shown in FIG. 1.

Referring to the drawings, a conveyor chain assembly 10 is illustrated in FIGS. 1 and 2 and includes a multiplicity of rows of intermeshed chain modules 12 of which only three are depicted in FIGS. 1 and 2. While in the illustrated construction the rows of modules are made up of only a single module, the rows of modules could include more than one module to form a wider conveyor chain. Each module 12 may be comprised of molded plastic and includes opposite ends 16 and 18, an intermediate section 20 and a longitudinal axis 22. A plurality of link ends 24 project forwardly and rearwardly from the intermediate section 20 with respect to the direction of movement of the conveyor chain 10. A first set 26 of link ends 24 projects forwardly of the intermediate section 20 and a second set 28 of link ends 24 projects rearwardly of the intermediate section 20. The intermediate section 20 thus integrally joins the first set 26 and the second set 28 of link ends 24. The link ends 24 include therethrough coaxially aligned openings or bores 30.

Either the first set 26 or the second set 28 of link ends 24 includes a special type of link end or terminating link end 32 which forms each end 16 and 18 of the module 12. The terminating link 32 end includes an outer portion 34, an inner portion 36 and an end wall 38 (FIGS. 3 and 5). The coaxially aligned opening 30 of the terminating link end 32 has an outer part 40 and an inner part 42. The outer part is defined by an annular wall 44 (FIGS. 4 and 7).

The link ends 24 of each module 12 intermesh with the link ends 24 of a module 12 in an adjacent row to form the conveyor chain. The modules 12 are interconnected in this intermeshed position by a pivot, hinge or chain pin 46 running through the coaxially aligned openings 30 of the intermeshed link ends 24 of adjacent modules 12. The chain pin 46 has a longitudinal axis 48 (FIG. 4) and two ends 50, 52.

Continuing to refer to FIGS. 1 and 2, the module 12 further includes a socket 54 on each end 16 and 18 of the module 12. More specifically, the socket 54 is defined by the intermediate section 20 and the terminating link end 32. The socket 54 includes a shaft cavity 56 that is parallel to the direction of the coaxially aligned openings 30 and parallel to the axis 22 of the module 12. The shaft cavity 56 has a longitudinal axis 58 and is spaced from the coaxially aligned openings 30. The shaft cavity 56 includes a first inlet 60, a second inlet 62 (FIG. 4), a head portion 64, and a leg portion 66. A wall 68 separates the head portion 64 from the leg portion 66. The wall 68 has an outer and an inner surface 70 and 72 respectively and has an aperture 74 therethrough. The aperture 74 allows communication between the head portion 64 and the leg portions 66.

The socket 54 further includes an arm cavity 76 having an inlet 78 (FIG. 4). The arm cavity 76 is transverse to the direction of the coaxially aligned openings 30 and transverse to the axis 22 of the module 12. The arm cavity 76 communicates with the shaft cavity 56. The arm cavity 76 separates the terminating link end 32 into the outer portion 34 with the outer part 40 of the opening 30 and the inner portion 36 with the inner part 42 of the opening 30. The arm cavity 76 communicates with both the outer and inner parts 40 and 42 of the opening 30.

As shown in FIGS. 4 and 8, a chain pin retaining plug 80 is mountable in the module 12 for selectively restricting axial movement of the chain pin 46. The plug 80 includes a first portion or shaft 82 that is mountable in the shaft cavity 56 of the socket 54. The shaft 82 includes a shank 84 with a circular head 86 extending therefrom. The head 86 has a top surface 88 having therein a slot 90. The shaft 82 further includes means for securing the plug 80 in the socket 54 in the form of a pair of spaced legs 92 extending from the shank 84 in a direction opposite to that of the head 86. The legs are resilient such that the legs 92 can be deflected. Each leg 92 is tapered to facilitate insertion into the module 12 and each leg 92 terminates in a shoulder 94.

Continuing to refer to FIGS. 4 and 8, the plug 80 further includes a second portion or arm 96 that is selectively housed in the arm cavity 76 of the socket 54 and moveable between a first position wherein the arm 96 does not restrict axial movement of the chain pin 46 (FIG. 5) and a second position wherein the arm 96 does restrict axial movement of the chain pin 46 (FIG. 4). The arm 96 is integral with and extends outwardly from the shank 84. A projection 98 extends from the arm 96 in the same direction the head 86 extends from shank 84.

As shown in FIG. 8, the projection 98 has a top surface 100, a pair of linear edges 102 and 104 and a pair of curved edges 106 and 108. The top surface 100 has a pair of chamfered portions 110 and 112 that are adjacent the curved edges 106 and 108 and a rectangular portion 114 between the chamfered portions 110 and 112. The projection 98 comprises a means for releasably positioning the arm 96 in the arm cavity 76.

The plug 80 is insertable into the module 12 as follows with reference to FIGS. 4, 5, and 7. With resilient legs 92 first, the shaft 82 is moved in the shaft cavity 56 via the first inlet 60 in a direction parallel to the axis 48 of the chain pin 46. As the plug 80 is moved further into the shaft cavity 56, the resilient legs 92 contact the outer surface 70 of the wall 68 and must deform inwardly to enable the shoulders 94 to slide through the aperture 74. After the shoulders 94 have passed through the aperture 74 and into the leg portion 66 of the shaft cavity 56, the legs 92 resume their original orientation and spring outwardly. In this position, the shoulders 94 contact the inner surface 72 of the wall 68 and the wall 68 does not allow the shoulders 92 to pass back through the aperture 74 thus retaining the plug 80 in the socket 54 and providing a snap-fit. This first snap-fit is intended to be permanent in that the plug 80 is not designed to be removed from the module 12 after placing it in this position. Further, in this position, the head 86 is flush with the end 16 of the module 12, and the shank 84 contacts the outer surface 70 of the wall 68 to prohibit the plug 80 from moving further into the interior of the module 12. As shown in phantom in FIG. 5, the arm 96 is in its first position filling the second inlet 62 of the shaft cavity 56 and not restricting the axial movement of the chain pin 46 such that the chain pin 46 can be inserted or removed from the aligned opening 30 in the link ends 24 without interference from the plug 80.

When axial movement of the chain pin 46 needs to be restricted, such as when the conveyor is in operation, the arm 96 is moved into the second position as follows. Referring to FIG. 5, a tool such as a slotted screw driver is inserted into the slot 90 of the head 86 and rotated to enable the plug 80 to be pivoted about the axis 58 of the shaft cavity 56. The plug 80 is rotatable in only one direction because the end wall 38 of the terminating link end 32 prohibits rotation of the plug 80 in the other direction. While the plug 80 is being pivoted in the socket 54, the arm 96 enters the arm cavity 76 through the inlet 78 and the rectangular portion 114 of the top surface 100 of the projection 98 contacts the outer portion 34 of the terminating link end 32 causing the outer portion 34 to deform outwardly. This outward deformation allows the arm 96 to pass further into the arm cavity 76 until the projection 98 is clear of the outer portion 34 and the outer portion 34 returns to its normal orientation thus providing a second snap-fit as shown in FIG. 4. In this second position as shown in FIGS. 3, 4, and 6, the arm 96 is fully inserted into the arm cavity 76 with no part thereof projecting outwardly from the module 12. The arm 96 occludes communication between the outer and inner parts 40 and 42 of the opening 30. Further, the projection 98 extends into the outer part 40 of the opening 30 such that the curved edges 106 and 108 of the projection 98 contact the annular wall 44 and restrict pivotal movement of the arm 96 out of the arm cavity 76. In this second position, the arm 96 restricts axial movement of one end 50 of the chain pin 46. As shown in FIGS. 1 and 2, a second plug 80 in this position on the other end 18 of the module 12 would restrict axial movement of the other end 52 of the chain pin 46. If the rows of the conveyor chain assembly include more than one module 12, a plug 80 is inserted only into the socket of the modules 12 that form the ends of the rows. Thus, only two plugs 80 are utilized per row for either row configuration.

The second snap-fit is not intended to be permanent in that it is disengagable. If access or removal of the chain pin 46 is desired, the plug 80 is not removed from the module 12 but rather pivoted so that the arm 96 returns to the first position as hereafter described. The slotted screw driver is placed into the slot 90 of the head 86 and rotated to pivot the plug 80. As the plug 80 is pivoted, the chamfered portion 112 of the projection 98 causes the outer portion 34 to deform outwardly enabling the arm 96 to clear the outer portion 34 of the terminating link end 32 and return to the first position in which the plug 80 does not restrict the axial movement of the chain pin 46.

Once the plug 80 is inserted into and secured in the shaft cavity 56, it is not designed to be removable from the module 12. However, even though the plug 80 is not removable from the module 12, the chain pin 46 can still be removed or alternatively its movement restricted. The invention allows access to each chain pin 46 from either end of the row via the plug 80. When the plug 80 is restricting axial movement of the chain pin 46, the plug 80 is more securely positioned in the module 12 because of the two snap-fits which reduce the chances of the plug 80 popping out of the module 12. More specifically, the arm 96 provides additional load carrying capacity to the plug 80. In the ideal operation of the conveyor chain assembly 10, the arm 96 is not required to assume much load. However, when a product is channeled to one side of the conveyor chain assembly 10 or the conveyor chain assembly 10 is misaligned, an uneven load distribution in the link ends 24 results. This uneven load can be transmitted to the chain pin 46 causing an axial component of the uneven load to force the chain pin 46 out to one side of the module 12. Because the arm 96 is perpendicular to the axis 48 of the chain pin 46, these axial forces of the chain pin 46 cause the pin to engage the arm 96 in such a manner as to lock the plug 80, and more specifically the projection 98 of the arm 96, in place all the more as well as distribute the axial load of the chain pin 46 onto the terminating link ends 32. This transfer of forces causes the plug 80 to work under greater adversities while providing a greater level of reliability to the user.

Further, the plug 80 does not project outwardly of the module 12 because the arm 96 is in the arm cavity 76 and the head 86 is flush with the end 16 of the module 12. This positioning of the plug 80 does not alter the top of the conveyor chain assembly 10 and allows independent conveyor chains to run next to each other at equal or different speeds without the need for guides and without the fear of jamming. Running multiple conveyor chains very close together provides improved product handling and transfer of products on and off the conveyor chains.

I claim:

1. An apparatus for use in forming a conveyor chain, said apparatus comprising:
    a module including a first set of link ends projecting forwardly of said module and a second set of link ends projecting rearwardly of said module with respect to the direction of movement of the conveyor chain, an intermediate section integrally joining said first and second set of link ends, said module including opposite ends, at least some of said link ends including coaxially aligned openings adapted to receive a chain pin having a longitudinal axis, and at least one of said opposite ends including a socket; and
    a chain pin retaining plug detachably mounted in said socket for pivotal movement wherein a portion of said chain pin retaining plug is moveable between a first position wherein said portion of said chain pin retaining plug does not restrict axial movement of the chain pin and a second position wherein said portion of said chain pin retaining plug does restrict axial movement of the chain pin.

2. An apparatus for use in forming a conveyor chain, said apparatus comprising:
    a module including a first set of link ends projecting forwardly of said module and a second set of link ends projecting rearwardly of said module with respect to the direction of movement of the conveyor chain, an intermediate section integrally joining said first and second set of link ends, said module including opposite ends, at least some of said link ends including coaxially aligned openings adapted to receive a chain pin having a longitudinal axis, and at least one of said opposite ends including a socket; and
    a chain pin retaining plug including a first portion mounted in said socket and a second portion which is moveable when said first portion is housed in said socket between a first position wherein said second portion does not restrict axial movement of the chain pin and a second position wherein said second portion does restrict axial movement of the chain pin, and wherein said first portion of said plug pivots in said socket when said second portion moves between said first position and said second position.

3. An apparatus as set forth in claim 2 wherein said first portion is insertable into said socket in a direction parallel to the longitudinal axis of the chain pin.

4. An apparatus as set forth in claim 3 wherein said first portion includes a shaft and said second portion includes an arm projecting outwardly from said shaft and wherein said arm occludes one of said coaxially aligned openings in said link ends when said arm is in said second position.

5. An apparatus as set forth in claim 4 wherein said socket includes a shaft cavity adapted to house said shaft, and an arm cavity adapted to house said arm when said arm is in said second position.

6. An apparatus as set forth in claim 5 wherein said shaft cavity is spaced from said coaxially aligned openings.

7. An apparatus as set forth in claim 5 wherein said module has a longitudinal axis and wherein said shaft cavity is parallel to said longitudinal axis of said module and said arm cavity is transverse to said longitudinal axis of said module.

8. An apparatus as set forth in claim 1 and further including means for securing said plug in said socket.

9. An apparatus as set forth in claim 8 wherein said securing means includes at least one resilient leg on said plug.

10. An apparatus as set forth in claim 4 wherein said shaft has opposite ends, one of said opposite ends includes at least one resilient leg and the other of said opposite ends includes a head.

11. An apparatus as set forth in claim 10 wherein said head is positioned in said socket such that said head is flush with one of said opposite ends of said module.

12. An apparatus as set forth in claim 5 further comprising means for releasably positioning said arm in said arm cavity.

13. An apparatus as set forth in claim 12 wherein said positioning means includes a projection on said arm.

14. An apparatus for use in forming a conveyor chain, said apparatus comprising:
a module including a plurality of link ends projecting outwardly from said module, at least some of said link ends including coaxial aligned openings adapted to receive a chain pin, and a socket;
a chain pin having a longitudinal axis; and
a plug detachably mounted in said socket, said plug when mounted in said socket being supported for pivotal movement between a first position not restricting axial movement of the chain pin and a second position restricting axial movement of the chain pin.

15. An apparatus as set forth in claim 14 wherein said plurality of link ends includes a first set of link ends projecting forwardly of said module and a second set of link end projecting rearwardly of said module with respect to the direction of movement of the conveyor chain.

16. An apparatus as set forth in claim 14 wherein said plug is insertable into said socket in a direction parallel to said longitudinal axis of the chain pin.

17. An apparatus as set forth in claim 14 wherein said plug includes a shaft and an arm projecting outwardly from said shaft and wherein said arm occludes one of said coaxially aligned openings when said arm in said second position.

18. An apparatus as set forth in claim 17 wherein said socket comprises a shaft cavity adapted to house said shaft and an arm cavity adapted to house said arm.

19. An apparatus as set forth in claim 18 wherein said shaft cavity is spaced from said coaxially aligned openings.

20. An apparatus as set forth in claim 18 wherein said module has a longitudinal axis and wherein said shaft cavity is parallel to said longitudinal axis of said module and said arm cavity is transverse to said longitudinal axis of said module.

21. An apparatus as set forth in claim 14 and further including means for securing said plug in said socket.

22. An apparatus as set forth in claim 21 wherein said securing means includes at least one resilient leg on said plug.

23. An apparatus as set forth in claim 17 wherein said shaft has opposite ends, one of said opposite ends includes at least one resilient leg and the other of said opposite ends includes a head.

24. An apparatus as set forth in claim 23 wherein said module has an end surface and wherein said plug is mounted in said socket such that said head is flush with said end surface.

25. An apparatus as set forth in claim 18 further comprising means for releasably positioning said arm in said arm cavity.

26. An apparatus as set forth in claim 25 wherein said positioning means includes a projection on said arm.

27. A conveyor chain comprising:
a chain link including opposite ends, the opposite ends including openings adapted to house chain pins, the chain link also having an edge;
a chain pin housed in one of said openings in one of the opposite ends of the chain link; and
a plug detachably mountable in the opposite ends of the chain link and when mounted in the opposite end of the chain link being pivotally movable between a first position wherein the plug blocks outward movement of the chain pin beyond the edge of the chain link and a second position wherein the chain pin is movable beyond the edge of the chain link.

28. A conveyor chain comprising:
a multiplicity of rows of chain modules, each module having opposite ends and a plurality of link ends projecting forwardly and rearwardly from said module with respect to the direction of movement of the conveyor chain, the link ends having therein coaxially aligned openings and being adapted to intermesh with link ends of adjacent modules;
pivot pins passing through the coaxially aligned openings of the intermeshing link ends of adjacent modules; and
a plug detachably mountable in at least one of the ends of each module and when mounted in said at least one of the ends being pivotally movable between a first position wherein the plug blocks outward movement of one of the pivot pins beyond the opposite ends of the module and a second position wherein the plug does not block outward movement of said one of the pivot pins beyond the end of the module.

* * * * *